United States Patent [19]
Polish

[11] Patent Number: 5,963,202
[45] Date of Patent: Oct. 5, 1999

[54] SYSTEM AND METHOD FOR DISTRIBUTING AND MANAGING DIGITAL VIDEO INFORMATION IN A VIDEO DISTRIBUTION NETWORK

[75] Inventor: Nathaniel Polish, New York, N.Y.

[73] Assignee: Instant Video Technologies, Inc., San Francisco, Calif.

[21] Appl. No.: 08/837,202

[22] Filed: Apr. 14, 1997

[51] Int. Cl.$^6$ .................................................. H04N 7/173
[52] U.S. Cl. ................................. 345/327; 348/7
[58] Field of Search .................... 348/7, 12, 13, 348/10, 11; 455/4.2, 5.1, 6.2, 6.3; 345/327; 395/200.49; H04N 7/16, 7/173

[56] References Cited

U.S. PATENT DOCUMENTS

| | | | |
|---|---|---|---|
| 5,371,532 | 12/1994 | Gelman et al. | 348/7 |
| 5,710,970 | 1/1998 | Walters et al. | 348/7 |
| 5,721,815 | 2/1998 | Ottesen et al. | 348/7 |
| 5,729,280 | 3/1998 | Inoue et al. | 348/7 |
| 5,737,009 | 4/1998 | Payton | 348/7 |
| 5,742,347 | 4/1998 | Kandlur et al. | 348/7 |
| 5,815,194 | 9/1998 | Ueda | 348/7 |

*Primary Examiner*—Chris Grant
*Attorney, Agent, or Firm*—Carr & Ferrell LLP

[57] ABSTRACT

The video distribution network system includes client configuration data, a client video buffer for storing video information, a client video driver coupled to the client video buffer for presenting a portion of the video information on a display device, a current status manager for determining current client status information indicative of the portion of video information presented, a computations engine coupled to the client video buffer and to the current status manager for forwarding a burst of video information to the client video buffer based on the client configuration data and on the client status information, and a video buffer controller coupled to the client video buffer for controlling storage of the burst in the client video buffer.

47 Claims, 8 Drawing Sheets

(3 secs of play)

(2 secs of rewind)

(3 secs of play and 2 secs of rewind)

SYSTEM AND METHOD FOR DISTRIBUTING AND MANAGING DIGITAL VIDEO INFORMATION IN A VIDEO DISTRIBUTION NETWORK

CROSS-REFERENCE TO RELATED APPLICATIONS

This application is related to co-pending patent application Ser. No. 08/681,172, filed on Jun. 29, 1996, entitled "System and Method for Managing Digital Video Distribution Using Burst Transmission," by inventor Nathaniel Polish, which subject matter is hereby incorporated by reference. This related application has been commonly assigned to Instant Video Technology, Inc.

BACKGROUND OF THE INVENTION

1. Field of the Invention

This invention relates generally to digital video, and more particularly to a system and method for distributing and managing digital video information in a video distribution network.

2. Description of the Background Art

Conventional network digital video servers operate in a multithreaded environment to distribute digital video (and corresponding audio) information to multiple client computers. The client computers in turn offer VCR-like control of the digital video information including fast forward, rewind, pause, stop and play to a user. In some embodiments, the requesting client computer waits to receive the entire digital video work before beginning playback so that the user can enjoy seamless playback. However, to store an entire digital video work, significant local disk space and other memory resources are needed.

In other embodiments, the client computer requests appropriate portions of the digital video work and presents the portions on a display device as they are received. If the application software is properly designed and the network communications channel over which the client computer and the server are operating is predictable, then these requests may be totally transparent to the user and seamless playback is achieved. However, if the digital video data is not delivered within a rather tight time window, then the client computer stalls and playback is noticeably affected. At best, this can result in jerky playback of or noticeable pauses in the digital video work. At worst, the application software may not be designed to handle a network communication failure at all, which could result in various system failures more consequential than an annoyance in the digital video work playback.

One typical solution to this problem is to design the system for the worst-case scenario to prevent the problem from ever occurring. Accordingly, overall video server throughput is computed for a worst-case bit rate which, based on current digital video compression techniques, may be over five times the average required bit rate. The worst case scenario provides a system which inefficiently uses network bandwidth. Further, this approach does not function well in an environment, such as the internet, that does not have dedicated mechanisms for assuring available network bandwidth. The traditional methodology does not scale beyond a simple Local Area Network (LAN) environment. Therefore, a system and method are needed to distribute and manage digital video information in a video distribution network environment beyond a LAN.

SUMMARY OF THE INVENTION

The present invention provides a system and method for distributing and managing digital video information in a video distribution network. The video distribution network system includes client configuration data, a client video buffer for storing video information, a client video driver coupled to the client video buffer for presenting a portion of the video information on a display device, a current status manager for determining current client status information indicative of the portion of video information presented, a computations engine coupled to the client video buffer and to the current status manager for forwarding a burst of video information to the client video buffer based on the client configuration data and on the client status information, and a video buffer controller coupled to the client video buffer for controlling storage of the burst in the client video buffer.

The method includes the steps of storing video information in a client video buffer, controlling presentation of a first portion of the video information on a display device, forwarding to the computations engine client status information based on the presentation of the first portion of the video information, forwarding to the client video buffer a burst of video information based on client configuration data and on the client status information, and storing the burst of video information at locations in the client video buffer based on the client status information.

DETAILED DESCRIPTION OF THE PREFERRED EMBODIMENT

Figure 1:
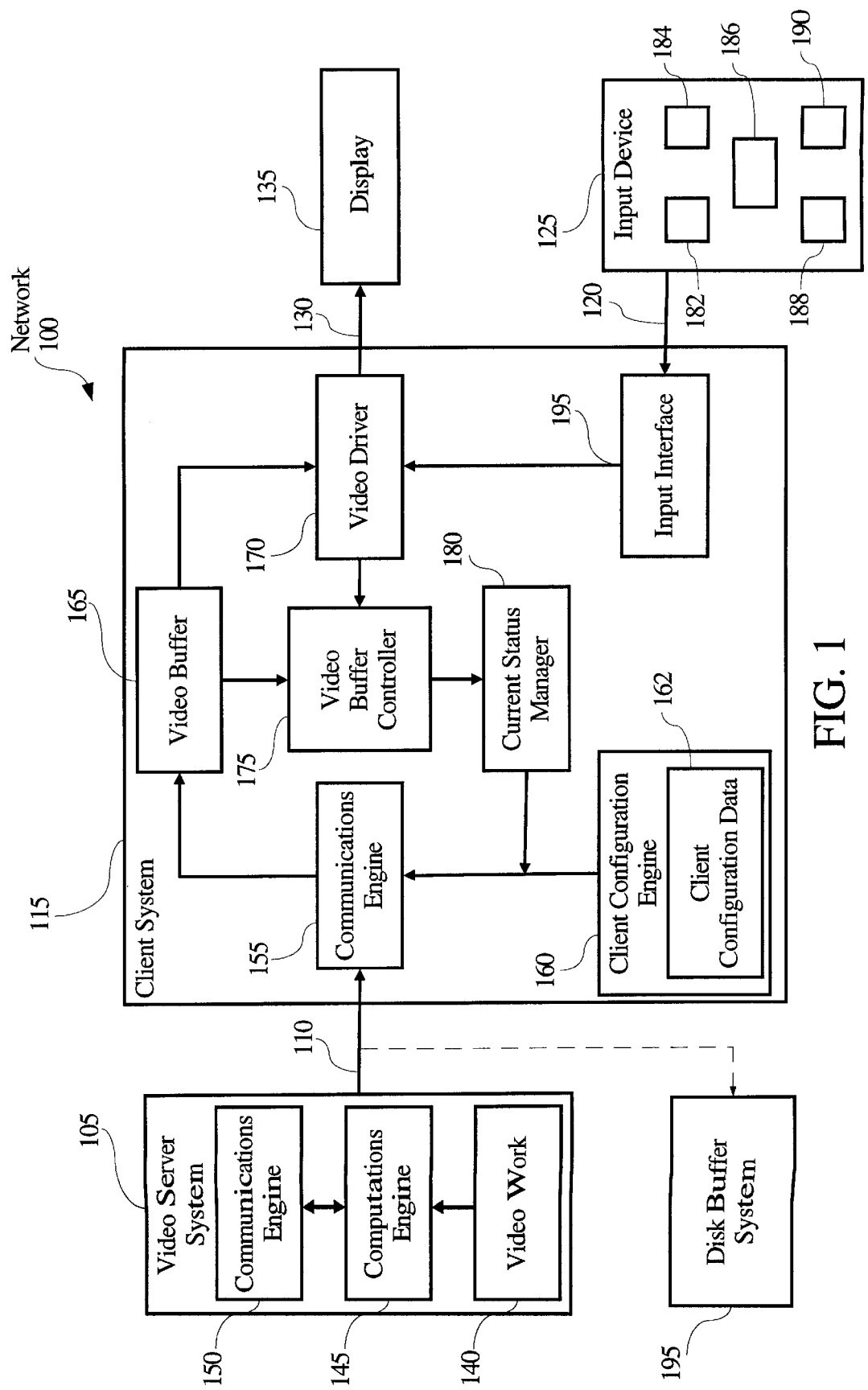
FIG. 1 is a block diagram illustrating a burst video distribution network for managing digital video information in accordance with the present invention.

FIG. 1 is a block diagram of a burst video distribution network 100, which includes a video server system 105 coupled via a signal bus 110 to a client system 115. The client system 115 is coupled via a communications channel 120 to an input device 125 and coupled via a communications channel 130 to a display device 135. The client system 115 receives input control signals from a user via the input device 125 and accordingly forwards appropriate video information to a display device 135.

The video server system 105 stores a video work 140 such as a music video, and includes a computations engine 145 for sizing and selecting a burst of video information from the video work 140 to forward to the client system 115. The computations engine 145 selects and forwards the burst to a communications engine 150, which compresses (e.g., using MPEG compression), packages, addresses and forwards the burst via the communications channel 110 to the client system 115. Operations by the computations engine 145, including determining whether to allow a client system 115 to access the video server system 105 and selecting the most appropriate client system 115 in an environment having multiple client systems 115, are described in greater detail in the cross-referenced patent application which is herein incorporated by reference.

The client system 115 includes a communications engine 155 for decompressing bursts from the video server system 105 and for compressing, packaging, addressing and transmitting information to the communications engine 150 as described herein. A client configuration engine 160 forwards client configuration data 162 to the communications engine 155, which forwards the data 162 via the communications engine 150 to the computations engine 145. The computations engine 145 then uses the data 162 to determine whether to allow the client system 115 to access the video server system 105. That is, the computation engine 145 can examine the needs of the client system 115 to determine whether the video server system 105 has sufficient capacity available to grant access. If access is granted, the computations engine 145 then uses the client configuration data 162 to determine the size of the burst of video information to forward to the client system 115.

Upon receipt of a burst of video information, the communications engine 155 forwards the burst to a video buffer 165 for storage. A video buffer controller 175 manages the video buffer 165, i.e., tracks which portions of the video buffer 165 are available for storage. Management of the video buffer 165 is described in greater detail below with reference to FIGS. 4–7. A video driver 170 extracts video information from the video buffer 165 to present on the display device 135. After presenting the video information, the video driver 170 informs the video buffer controller 175 which updates the video buffer 165 accordingly.

A user operating an input device 125 can control the presentation of video information by effectively controlling the video driver 170. That is, the user can select an input control signal from options including rewind 182, fast forward, 184 play 186, pause 188 and stop 190. The input device 125 forwards the selected user control signal to an input interface 195, which sends the user control signal to the video driver 170. Based on the selected control signal, the video driver 170 regulates the video information extracted from the video buffer 165. For example, if play 186 is selected, then the video driver 170 extracts video information from the video buffer 165 to produce a real-time video presentation. If rewind 182 is selected, then the video driver 170 selects relevant portions, such as every third frame, of the video information from the video buffer 165 in the reverse direction to produce a quick rewinding video presentation.

The video buffer controller 175 informs a current status manager 180 of the current status of video information stored in the video buffer 165. The current status includes the amount of future video information and the amount of past video information. For example, the current status information may indicate that about two seconds of future video information (or about two megabytes of video information) and about eight seconds of past video information (or about eight megabytes of video information) remains in the video buffer 165. Based on either the current status or at predetermined intervals, for example, every three seconds, the current status manager 180 forwards current status information to the computations engine 145 of the video server 105. The computations engine 145 uses the current status information, as described in the cross-referenced patent application, to size and select a burst of video information for transmission to the client 115.

Network 100 may further include a disk buffer system 195, for use by a production manager for storing a copy of the video work 140. As the video server system 105 forwards video information to the client system 115, the disk buffer system 195 copies the video information to memory (not shown). The disk buffer system 195 includes most of the same components of client system 115. However, the video buffer 165 is replaced by disk memory (not shown) which is sufficiently large to maintain the complete video work 140. The video buffer controller 175 is replaced by a disk memory controller (not shown), which examines the video information and stores it chronologically. Alternatively, the disk buffer system 195 may be coupled within the client system 115 to the communications engine 155 and to the video driver 170 for storing a copy of the video work as presented on the display 135.

Figure 2:
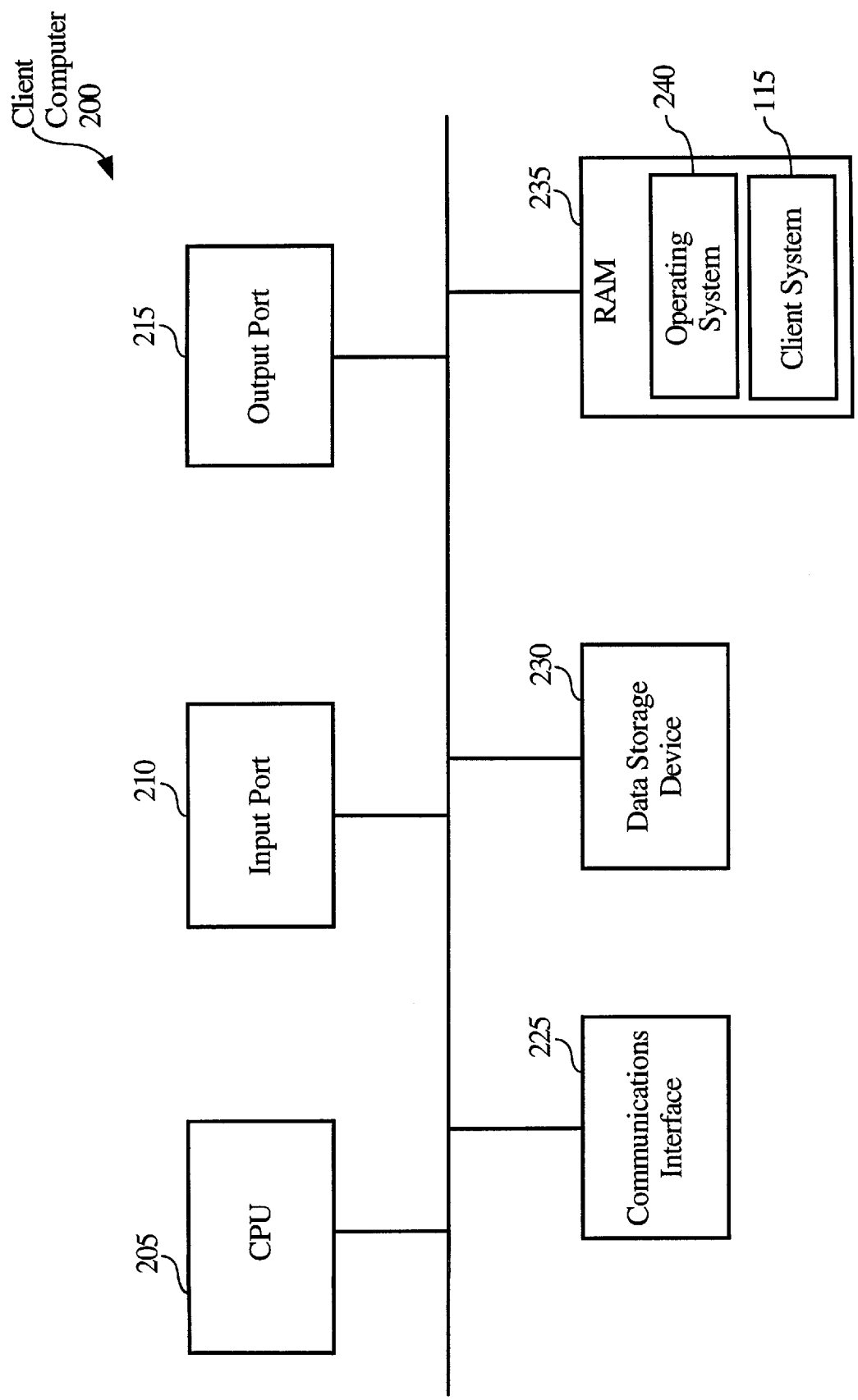
FIG. 2 is a block diagram illustrating the client computer for controlling the client system of FIG. 1.

FIG. 2 is a block diagram of a computer system 200 including a Central Processing Unit (CPU) 205 such as a Motorola Power PC® microprocessor or an Intel Pentium® microprocessor. An input port 210 for attaching an input device such as a keyboard and mouse, and an output port 215 for attaching an output device such as a Cathode Ray Tube (CRT) display are coupled via a signal bus 220 to the CPU 205. A communications interface 225, a data storage device 230, such as Read Only Memory (ROM) and a magnetic disk, and a Random-Access Memory (RAM) 235 are further coupled via the signal bus 220 to the CPU 205. The communications interface 250 is conventionally coupled via the communications channel 110 such as an internet to the communications interface 310 (FIG. 3) of the video server 300.

An operating system 240 includes a program that controls processing by the CPU 205, and is typically stored in the data storage device 230 and loaded into the RAM 235 for execution. The client system 115 is a program which operates as described in FIG. 1, and may be stored also in the data storage device 230 and loaded into the RAM 235 for execution by the CPU 205.

Figure 3:
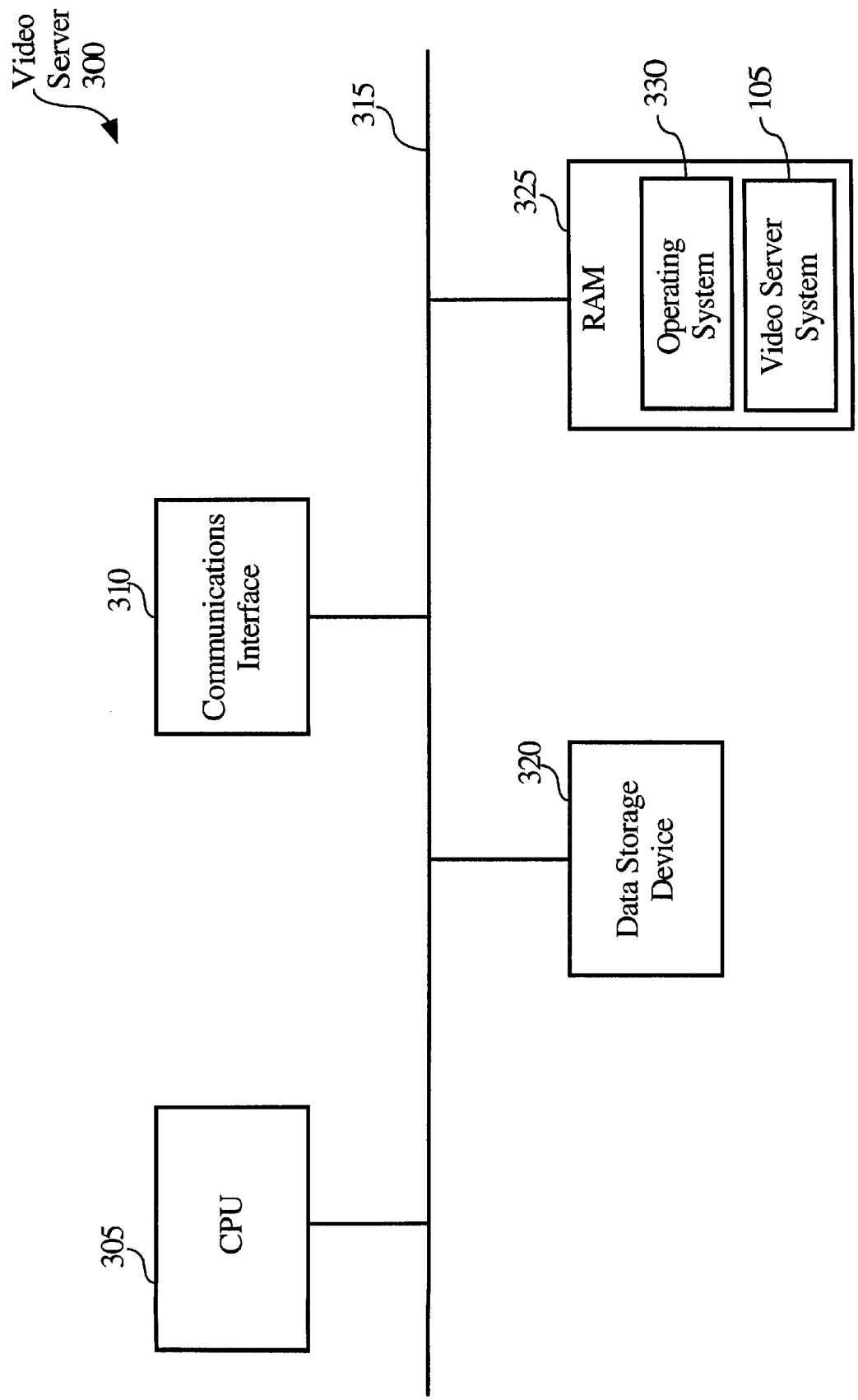
FIG. 3 is a block diagram illustrating the video server for controlling the video server system of FIG. 1.

FIG. 3 is a block diagram of a video server 300 including a CPU 305, a communications interface 310, a data storage device 320 and RAM 325 coupled to a signal bus 315. The communications interface 310 is conventionally coupled via the communications channel 110 to the communications interface 225 of the client computer 200.

An operating system 330 controls processing by the CPU 305, and is typically stored in the data storage device 320 and loaded into the RAM 325 for execution. The video server system 105 is a program which operates as described in FIG. 1, and may be stored also in the data storage device 320 and loaded into the RAM 325 for execution by the CPU 305.

Figure 4:
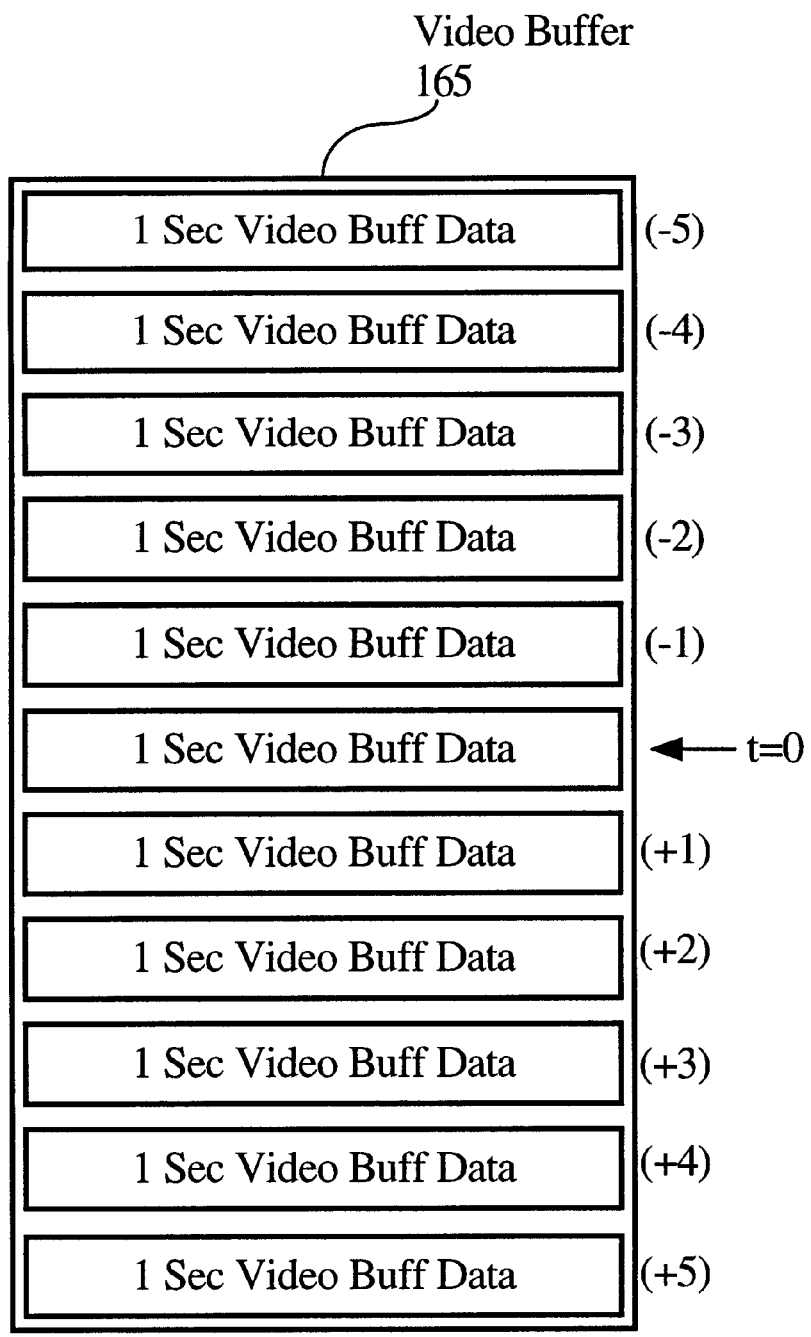
FIG. 4 is a block diagram illustrating the video buffer of FIG. 1 in an initial state.

FIG. 4 is a block diagram illustrating the video buffer 165 in an initial state. The video buffer 165 is illustrated as including eleven sequential seconds of digital video information including the current second of video information (i.e., the second of video information to be played immediately on the display 135 based on the user's request via the input device 125), five previous seconds of video information and five future seconds of video information. That is, the computations engine 145 of the video server system 105 determines, based on the client configuration data 162 and on the current status of the client system 115, to send eleven seconds of the video work 140 to the client system 115. The eleven seconds of information are stored in the video buffer 165 of the client system 115 and managed by the video buffer controller 175.

The video buffer controller 175 maintains a pointer to the current second of video information (labeled as "t=0") and can easily compute positions of the other seconds of information relative to the position of the current pointer. Thus, the video buffer controller 175 currently knows that the five seconds of information preceding the current second of information [labeled as "(−5)," "(−4)," "(−3)," "(−2)" and "(−1)"] correspond to the five previous seconds of information and that the five seconds of information following the current second of information [labeled as "(+1)," "(+2)," "(+3)," "(+4)" and "(+5)"] correspond to the five future seconds of information. Although the video buffer controller 175 is illustrated and described as using only one pointer to the video buffer 165, the video buffer controller 175 may use additional pointers to maintain the temporal organization of the video information without requiring that the physical organization correspond to the temporal organization.

Figure 5:
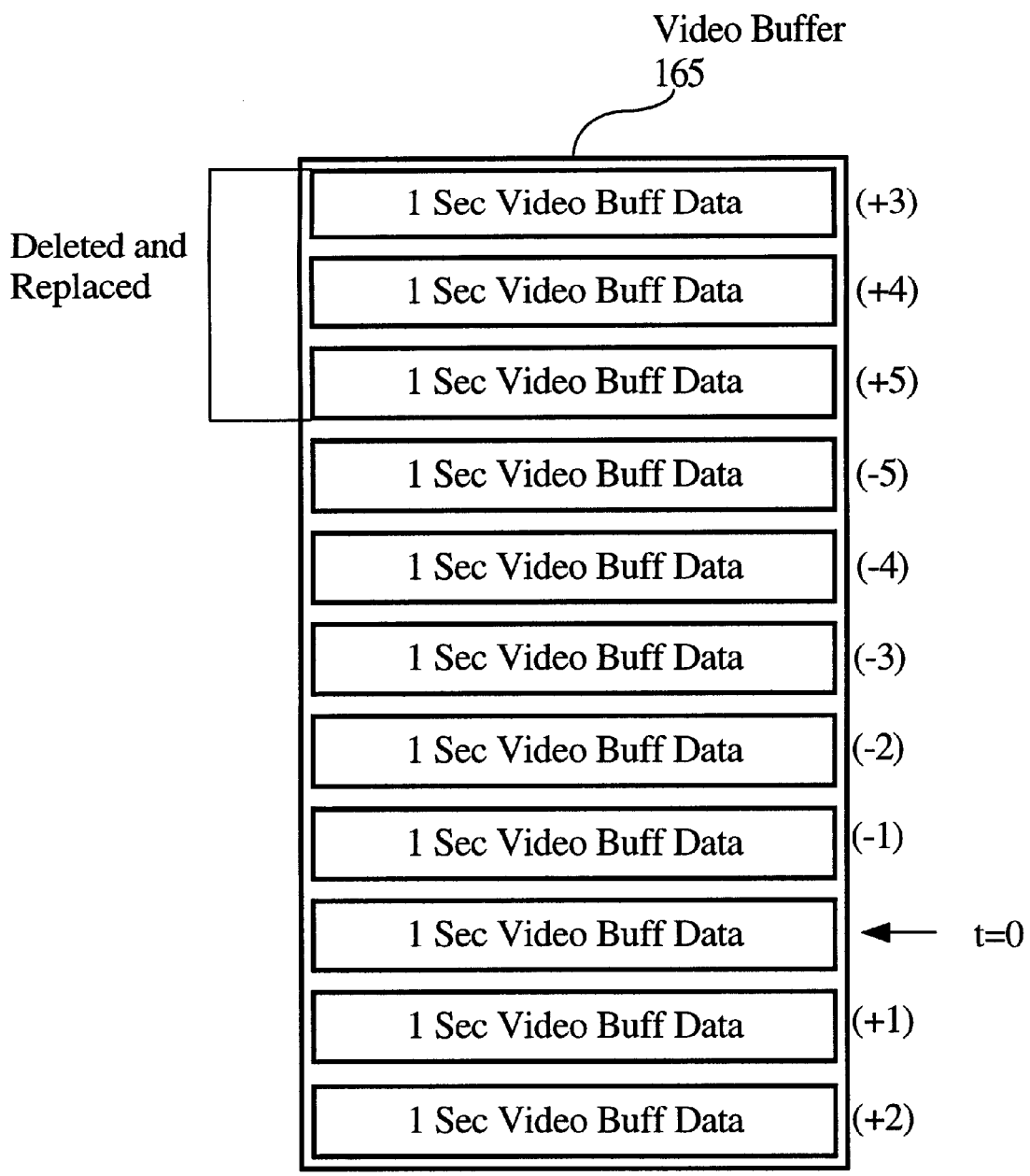
FIG. 5 is a block diagram illustrating the video buffer of FIG. 1 after three seconds of play.

FIG. 5 is a block diagram illustrating the video buffer 165 of FIG. 4 after three seconds of playback relative to the state of video buffer 165 in FIG. 4. The video buffer controller 175 updates the pointer to reference the current second of video information which is three seconds of information beyond the current second discussed in FIG. 4. Accordingly, the video buffer controller 175 determines that the video buffer 165 presently includes two future seconds and eight previous seconds of video information.

Since the video buffer controller 175 of the exemplary embodiment described herein maintains five future seconds and five previous seconds of information, the video buffer controller 175 determines that the three oldest seconds [labeled in FIG. 4 as "(−3)," "(−4)" and "(−5)"] are expendable. The current status manager 180 of the client system 115 sends current status information to the computations engine 145 of the video server system 105, which accordingly sends three future seconds of information to the client system 115. Upon receiving three future seconds of information, the video buffer controller 175 stores the three future seconds of information [labeled in FIG. 5 as "(+3)," "(+4)" and "(+5)"] in place of the three oldest seconds of information. The video buffer controller 175 can maintain the chronology of the eleven seconds of information by tracing all changes made to the video buffer 165.

Figure 6:
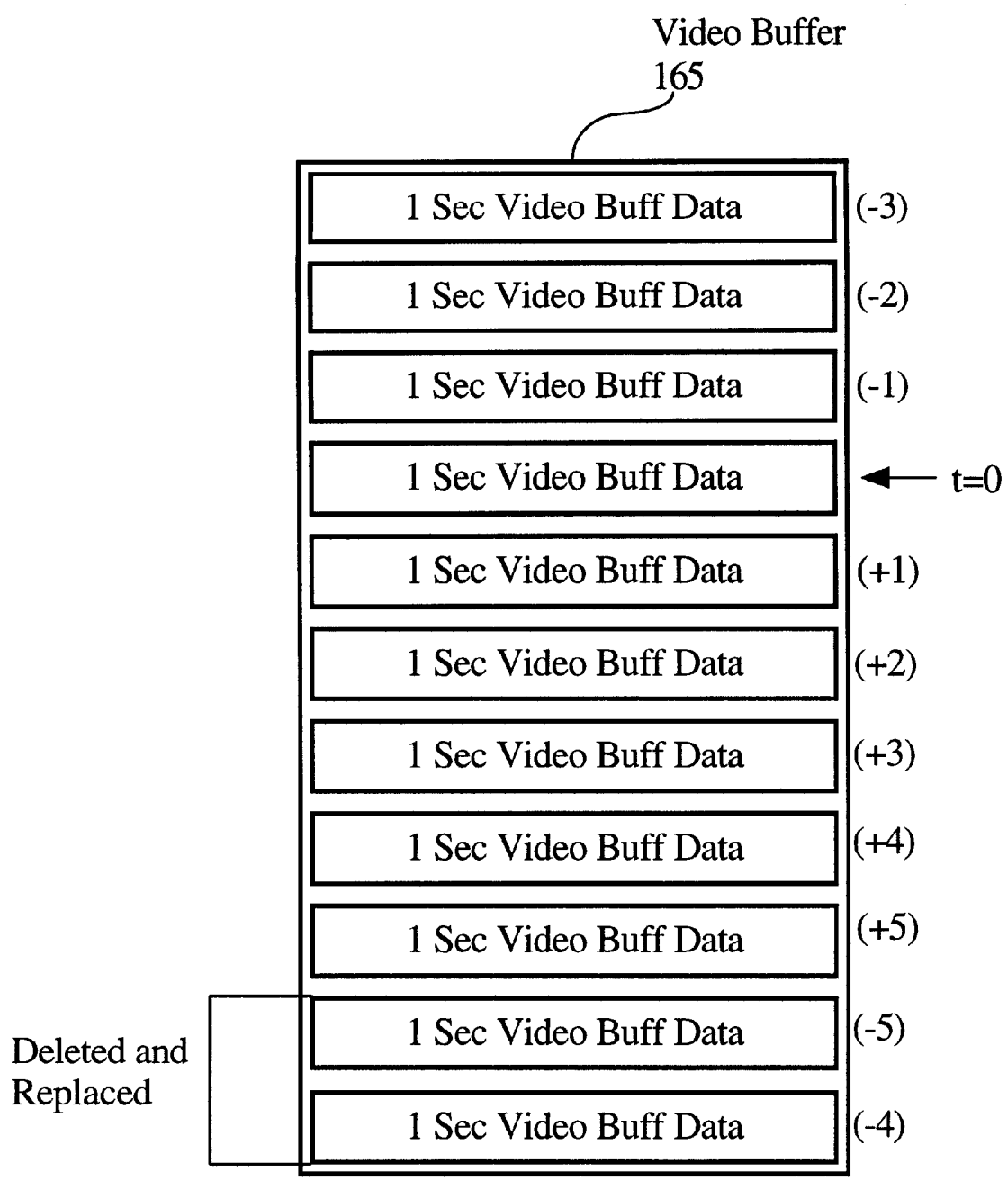
FIG. 6 is a block diagram illustrating the video buffer of FIG. 1 after two seconds of review.

FIG. 6 is a block diagram illustrating the video buffer 165 of FIG. 4 after rewinding two seconds of information relative to the state of video buffer 165 in FIG. 4. The video buffer controller 175 updates the current pointer to reference the current second of video information which is two seconds before the current second of information discussed in FIG. 4. Accordingly, the video buffer controller 175 determines that the video buffer 165 includes three previous seconds of information and seven future seconds of information.

As stated above, the video buffer controller 175 of the embodiment described herein maintains five future seconds and five previous seconds of information. Thus, the video buffer controller 175 determines that the sixth future second [labeled in FIG. 4 as "(+4)"] and seventh future second of information [labeled in FIG. 4 as and "(+5)"] are expendable and will replace them upon receipt of the two previous seconds of information [labeled in FIG. 6 as "(−4)" and "(−5)"] from the video server system 105.

Figure 7:
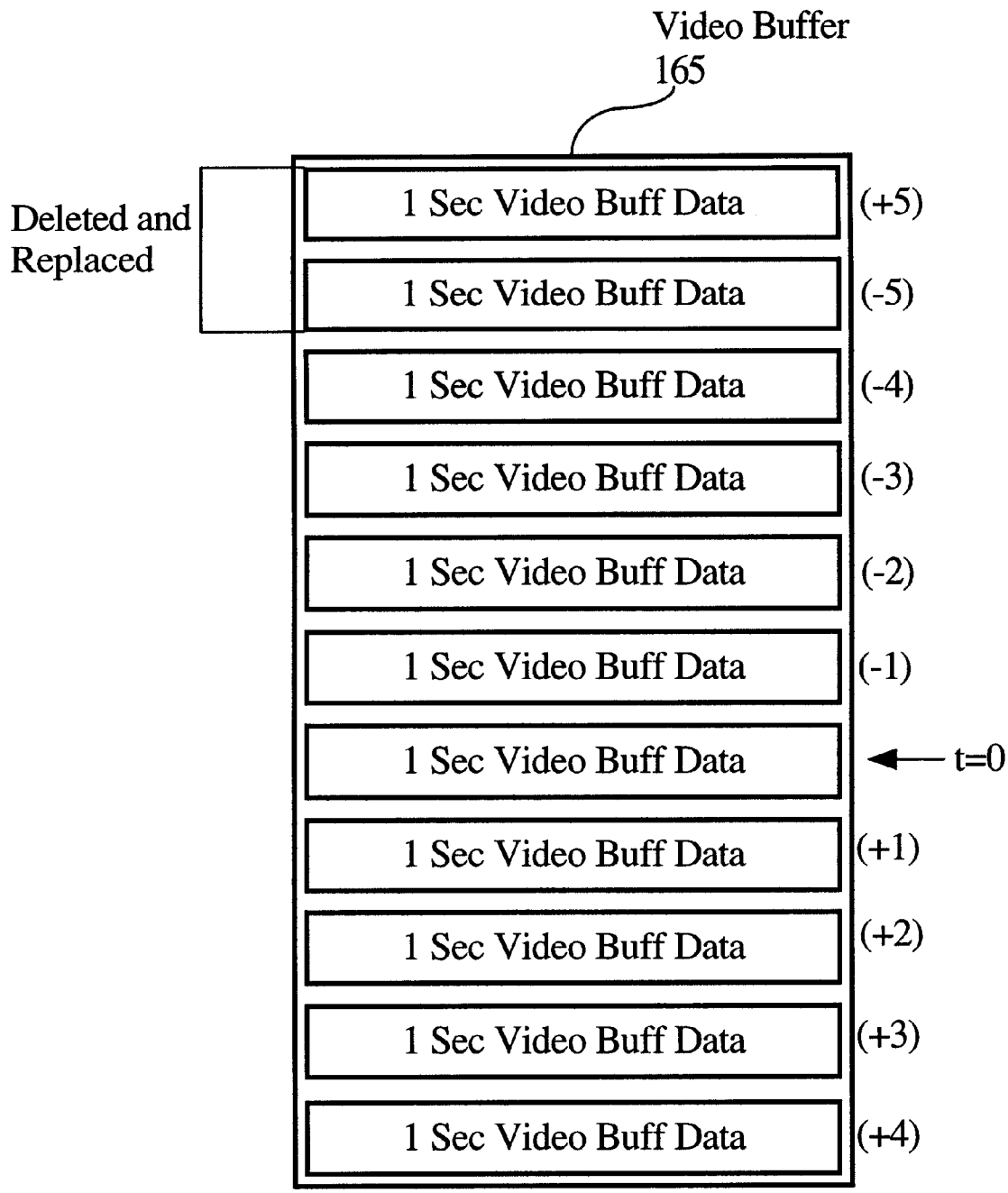
FIG. 7 is a block diagram illustrating the video buffer of FIG. 1 after three seconds of play and two seconds of review.

FIG. 7 is a block diagram illustrating the video buffer 165 of FIG. 4 after playing three seconds of information and then rewinding two seconds of information. FIG. 5 illustrates the video buffer 165 after three seconds of playback. Thus, updating the video buffer 165 shown in FIG. 5 for the two seconds of rewind is appropriate.

The video buffer controller 175 updates the FIG. 5 current pointer to reference the current second of information which is two seconds of information into the past. Accordingly, the video buffer 165 includes seven future seconds of information and three previous seconds of information, and the video buffer controller 175 determines that the two most future seconds of information [labeled in FIG. 5 as "(+4)" and "(+5)"] are expendable. Thus, upon receipt of two previous seconds from the video server system 105, the video buffer controller 175 will replace the two most future seconds of information with the two previous seconds of information [labeled in FIG. 7 as "(−4)" and "(−5)"].

Figure 8:
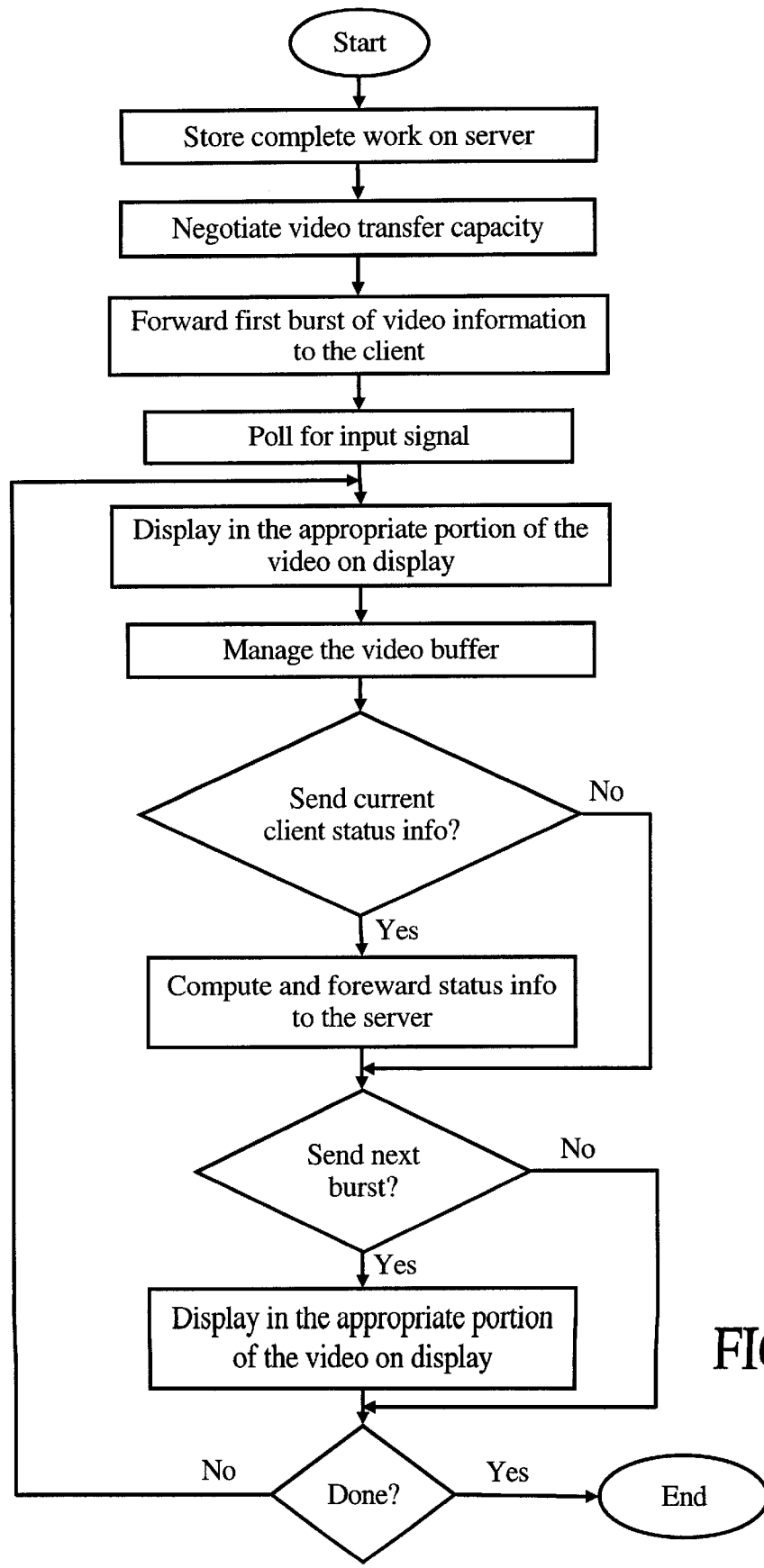
FIG. 8 is a flowchart illustrating a preferred method for managing digital video information in a vast video distribution network.

FIG. 8 is a flowchart illustrating a preferred method 800 for managing digital video information in a video distribution network 100. Method 800 begins with the video server system 105 in step 805 storing the complete video work 140 in memory 320 or 325. The video work 140 may be stored to the video server system 105 by transferring it from a compact disk, from a live recording or via the internet from another computer (not shown).

In step 810, video transfer capacity is negotiated as described in the co-pending, cross-referenced patent application. Briefly, the client system 115 requests access to the video work 140 and forwards client configuration information 1 62 to the video server system 105. The computations engine 145 examines the client configuration information 162 to determine whether server system 105 has sufficient transfer capacity available to allow the connection. If sufficient capacity is unavailable, then the video server system 105 and the client system 115 either negotiate reduced configuration data or terminate the connection.

Assuming an acceptable video transfer capacity has been negotiated, the computations engine 145 in step 815 forwards a first burst of the video work 140 to the client system 1 15, which stores the first burst in the video buffer 165.

The client system 115 in step 820 polls for an input signal, such as play, 186, rewind 182, fast forward 184, pause 188 and stop 190. Based on the input signal, the video driver 170 in step 825 retrieves the appropriate video information, i.e., the current second of information, from the video buffer 165 and forwards it to the display 135 for presentation. For example, if play 186 is selected, then the video driver 170 forwards video information to the display 135 for presenting the images in real time. If fast-forward 184 is selected, then the video driver 170 retrieves selected portions of the video information, such as every third future frame, from the video buffer 165 and forwards them to the display 135 for simulating VCR-like fast-forward. If rewind 182 is selected, then the video driver 170 retrieves selected portions of the video information, such as every third previous frame, from the video buffer 165 and forwards them to the display 135 for simulating VCR-like rewind. If pause 188 is selected, then the video driver 170 retrieves the video information representing the current frame and forwards it to the display 135 for maintaining a VCR-like pause. Lastly, if stop 190 is selected, then the video driver 190 may retrieve predetermined "blue screen" video information and forward it to the display 135 for presentation. Other possible input signals include strobe, ½ play, double fast-forward, etc.

The video buffer controller 175 in step 830 receives from the video driver 170 display status information indicative of what has been presented on the display 135 and accordingly manages the video buffer 165. The video buffer controller 175 maintains the status of the video buffer 165 and forwards the status to the current status manager 180. The current status manager 180 in step 835 determines whether predetermined criteria indicating that it is time to forward client status information to the computations engine 145 have been met. The predetermined criteria may be based on the number of seconds remaining in either direction. For example, if only three future seconds of video information remain in the video buffer 165, then the current status manager 180 may determine that it is time to inform the computations engine 105 of the client status. If the predetermined criteria have been met, the current status manager 180 in step 840 forwards the current status information to the computations engine 145. Method 800 then proceeds to step 845. Otherwise, if the predetermined criteria have not been met, then method 800 jumps over step 840 and continues at step 845.

In step 845, the computations engine 145 determines whether server system predetermined criteria indicating time to forward more of the video work 140 to the client system 115 have been met. In this case, the server system predetermined criteria may be based on client configuration data 162 including the expected client video information consumption rate, the expected video information transfer latency, the current input signal selected, etc. If the predetermined criteria have been met, then the computations engine 145 in step 850 computes and forwards a burst of the video work 140 to the client system 115 and method 800 proceeds to step 855. Otherwise, if the predetermined criteria have not been met, then the computations engine 145 jumps over step 850 and continues at step 855. In step 855, a determination is made whether to end the communication between the server system 105 and the client system 115. If so, then method 800 ends. Otherwise, the method returns to step 820.

The foregoing description of the preferred embodiments of the invention is by way of example only, and other variations of the above-described embodiments and methods are provided by the present invention. Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. The system is limited only by the following claims.

What is claimed is:

1. A computer-based method for managing digital video in a video distribution network, comprising the steps of:
   receiving an input control signal for selecting from a video buffer a first portion of video information for output;
   selecting for output, responsive to the input control signal, the first portion of the video information from the video buffer;
   requesting a burst of video information from a video server, the requesting step including the step of forwarding client status information to the video server; and
   replacing a second portion of the video information in the video buffer with the burst of video information.

2. The method of claim 1, wherein the input control signal is a playback request.

3. The method of claim 1, wherein the input control signal is a rewind request.

4. The method of claim 1, wherein the input control signal is a fast-forward request.

5. The method of claim 1, wherein the input control signal is a pause request.

6. The method of claim 1, wherein the input control signal is a stop request.

7. The method of claim 1, wherein the client status information indicates the amount of future video information and the amount of previous video information.

8. The method of claim 1, further comprising, after requesting the burst, the step of receiving from the video server the burst of video information responsive to the client status information.

9. The method of claim 8, further comprising the step of selecting the second portion based on the client status information.

10. The method of claim 9, wherein the step of selecting includes selecting the most expendable locations in the video buffer as the second portion.

11. A computer-based method, comprising the steps of:
    storing video information in a video buffer;
    receiving an input control signal;
    presenting a first portion of the video information on a display device responsive to the input control signal;
    forwarding current status information, indicative of the first portion presented, to a video server system;
    receiving a burst of video information, responsive to the current status information, from the video server; and
    replacing in the video buffer a second portion of video information, based on the current status information, with the burst of video information.

12. The method of claim 1, wherein the video buffer is sized to store only a predetermined amount of video information.

13. The method of claim 11, wherein the input control signal is a playback request.

14. The method of claim 11, wherein the input control signal is a rewind request.

15. The method of claim 11, wherein the input control signal is a fast-forward request.

16. The method of claim 11, wherein the input control signal is a pause request.

17. The method of claim 11, wherein the input control signal is a stop request.

18. The method of claim 11, wherein the current status information indicates the amount of future video information and the amount of previous video information.

19. The method of claim 11, further comprising, after receiving the burst, the step of selecting the most expendable locations in the video buffer as the second portion.

20. A system, comprising:
    a video buffer for storing video information;
    a video driver coupled to the video buffer for presenting a first portion of the video information on a display device;
    an input interface coupled to the video driver for receiving an input control signal which controls the video driver;
    a current status manager for forwarding current client status information, indicative of the first portion presented, to a video server system;
    a communications engine coupled to the video buffer for receiving a burst of video information from the video server system; and
    a video buffer controller coupled to the video buffer for controlling storage of the burst in the video buffer based on the current client status information.

21. The system of claim 20, wherein the video buffer is sized to store only a predetermined amount of video information.

22. The system of claim 20, wherein the input control signal is a playback request.

23. The system of claim 20, wherein the input control signal is a rewind request.

24. The system of claim 20, wherein the input control signal is a fast-forward request.

25. The system of claim 20, wherein the input control signal is a pause request.

26. The system of claim 20, wherein the input control signal is a stop request.

27. The system of claim 20, wherein the current status information indicates the amount of future video information and the amount of previous video information.

28. The system of claim 27, wherein the current status information further indicates the input control signal.

29. The system of claim 20, wherein the video buffer controller stores the burst in the most expendable locations in the video buffer.

30. A computer-readable storage medium storing program code for causing a computer to perform the steps of:

storing video information in a video buffer;

receiving an input control signal;

presenting a first portion of the video information on a display device responsive to the input control signal;

forwarding current status information, indicative of the first portion presented, to a video server system;

receiving a burst of video information, responsive to the current status information, from the video server; and replacing in the video buffer a second portion of video information, based on the current status information, with the burst of video information.

31. A system, comprising:

means for storing video information;

means for receiving an input control signal;

means for presenting a first portion of the video information on a display device responsive to the input control signal;

means for forwarding current status information, indicative of the first portion presented, to a video server system;

means for receiving a burst of video information, responsive to the current status information, from the video server; and means for replacing in the video buffer a second portion of video information, based on the current status information, with the burst of video information.

32. A computer-based method, comprising the steps of:

storing video information in client video buffer;

controlling presentation of a first portion of the video information on a display device;

forwarding to a computations engine client status information based on the presentation of the first portion of the video information;

forwarding to the client video buffer a burst of video information based on client configuration data and on the client status information; and storing the burst of video information at locations in the client video buffer based on the client status information.

33. The method of claim 32, wherein the client video buffer is sized to store only a predetermined amount of video information, and the client configuration data includes a value representing the predetermined amount.

34. The method of claim 32, wherein the client status information indicates the amount of future video information and the amount of previous video information.

35. The method of claim 32, wherein storing the burst includes the step of storing the burst at the most expendable locations in the video buffer.

36. The method of claim 32, further comprising, before controlling presentation of the first portion, the step of receiving an input control signal and wherein the step of controlling presentation is responsive to the input control signal.

37. The method of claim 36, wherein the input control signal is a playback request.

38. The method of claim 36, wherein the input control signal is a rewind request.

39. The method of claim 36, wherein the input control signal is a fast-forward request.

40. The method of claim 36, wherein the input control signal is a pause request.

41. The method of claim 36, wherein the input control signal is a stop request.

42. A network system, comprising:

client configuration data;

a client video buffer for storing video information;

a client video driver coupled to the client video buffer for presenting a portion of the video information on a display device;

a current status manager for determining current client status information indicative of the portion of video information presented;

a computations engine coupled to the client video buffer and to the current status manager for forwarding a burst of video information to the client video buffer based on the client configuration data and on the client status information; and a video buffer controller coupled to the client video buffer for controlling storage of the burst in the client video buffer.

43. The system of claim 42, wherein the client configuration data includes a value indicating the size of the client video buffer.

44. The system of claim 42, wherein the client status information indicates the amount of future video information and the amount of previous video information.

45. The system of claim 42, wherein the step of storing includes storing the burst of video information at the locations in the client video buffer having the most expendable data.

46. The system of claim 42, further comprising an input interface for receiving from a user an input control signal which controls the presentation of the first portion.

47. The system of claim 46, wherein the current client status information includes the input control signal.

* * * * *

UNITED STATES PATENT AND TRADEMARK OFFICE
CERTIFICATE OF CORRECTION

| | | |
|---|---|---|
| PATENT NO. | : 5,963,202 | Page 1 of 1 |
| APPLICATION NO. | : 08/837202 | |
| DATED | : October 5, 1999 | |
| INVENTOR(S) | : Nathaniel Polish | |

It is certified that error appears in the above-identified patent and that said Letters Patent is hereby corrected as shown below:

In column 1, line 7, the specification should be corrected to read as follows:

This application is a continuation in part and claims the priority benefit of co-pending patent application Ser. No. 08/681,172, filed on June 29, 1996 . . . .

Signed and Sealed this

Fifteenth Day of September, 2009

David J. Kappos
*Director of the United States Patent and Trademark Office*